Figure 1:
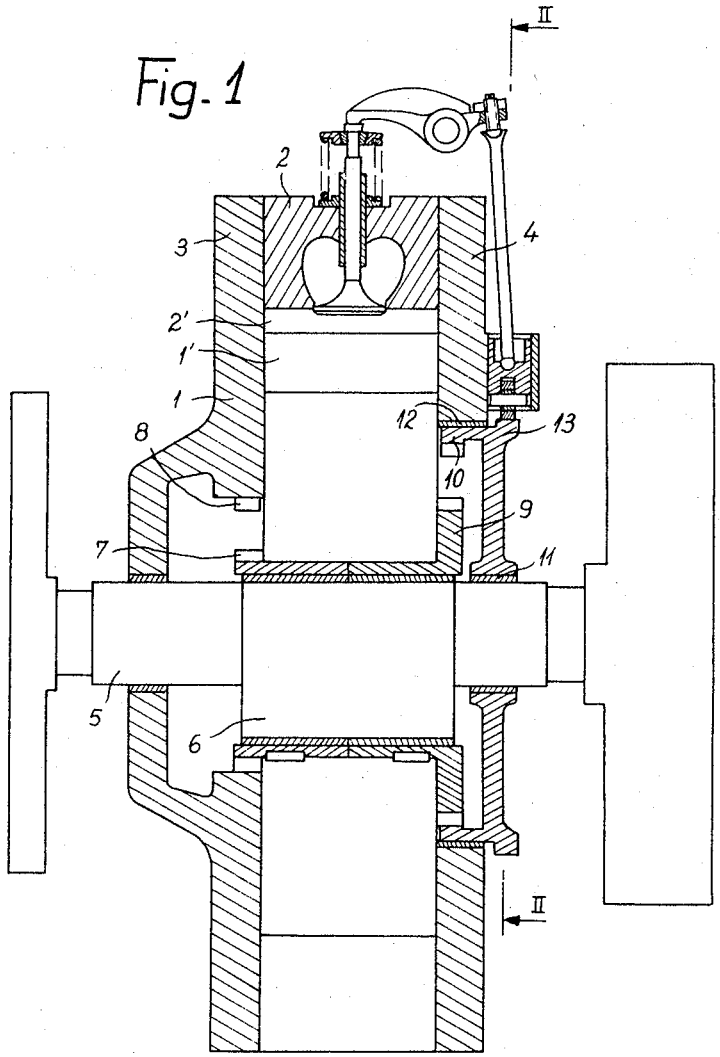

March 28, 1967  G. DE COYE DE CASTELET  3,311,093
ROTARY ENGINE TIMING-GEAR
Filed Nov. 30, 1964  2 Sheets-Sheet 1

Inventor
Gaëtan deCoye de Castelet
By Stevens, Davis, Miller & Mosher
Attorneys

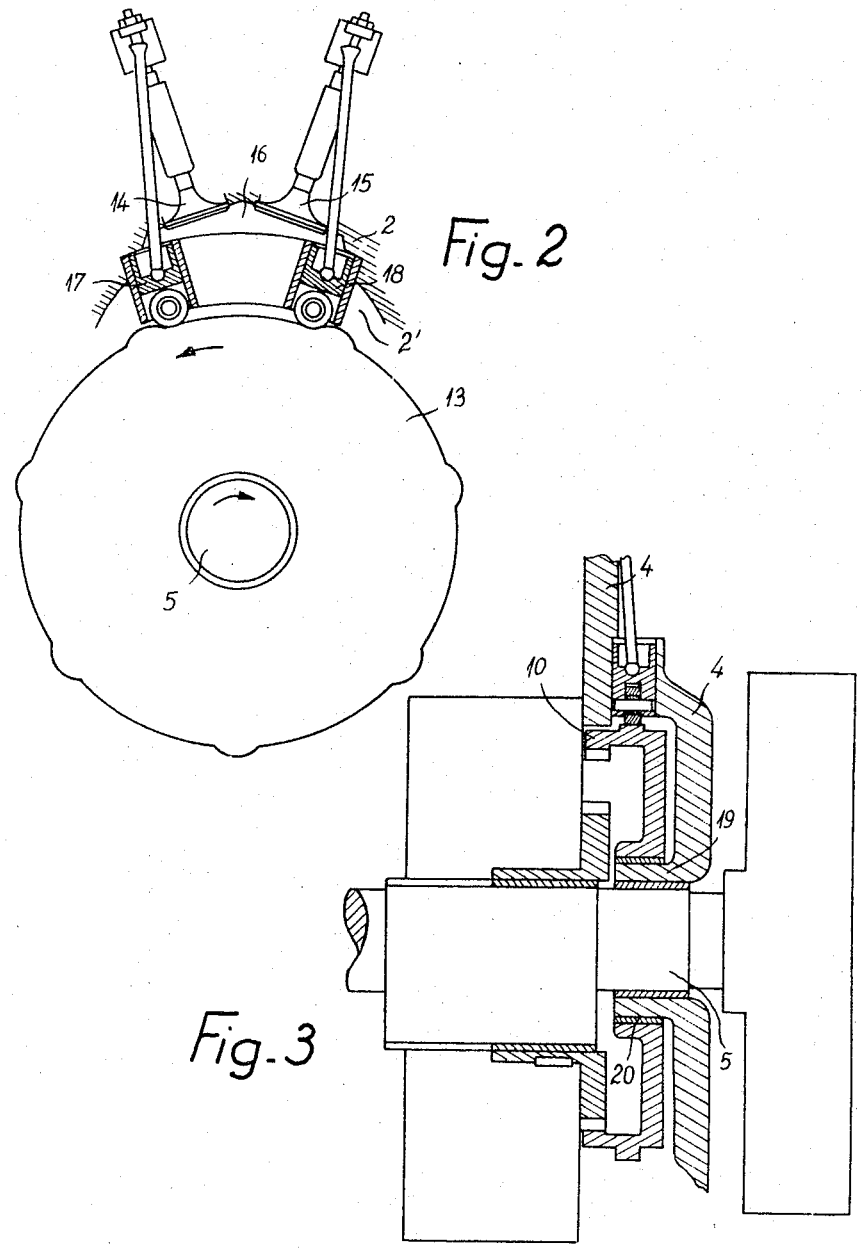

United States Patent Office 3,311,093
Patented Mar. 28, 1967

3,311,093
ROTARY ENGINE TIMING-GEAR
Gaëtan de Coye de Castelet, Billancourt, France, assignor to Regie Nationale des Usines Renault, Billancourt, France
Filed Nov. 30, 1964, Ser. No. 414,589
Claims priority, application France, Dec. 24, 1963, 958,309, Patent 1,418,786
3 Claims. (Cl. 123—8)

This invention relates to a rotary engine having a rotor with $2n$ lobes of epicycloidal profile rotating eccentrically in a stator having $2n+1$ working chambers, and more particularly to a four-stroke petrol or diesel engine having a rotor with four lobes and a stator with five working chambers. The invention most notably has for its object a method of operating the inlet and exhaust valves by a cam-plate concentric with the crankshaft.

The timing-gear of such an engine may be likened to that of a five-cylinder radial piston engine, and may be applied by recourse to any known means specific to radial engines, and more particularly to a cam-plate concentric with the crankshaft.

The present invention relates to the timing-gear for such an engine and principally consists in obtaining the timing by means of a single cam track cooperating both with the inlet valves and the exhaust valves, said cam track being provided on a plate concentric with the crankshaft.

The invention further relates to a special feature of the control means of this cam-plate, wherein the eccentric motion of the rotor is used. The invention additionally includes, in the specific case of an engine with four lobes and five working chambers, the combination of an arrangement of the exhaust and inlet valves of any one working chamber, considered in their respective positions in relation to the direction of rotation of the engine shaft, with a seven-cam plate rotating in the opposite direction to and at one-quarter the speed of said engine shaft.

These various dispositions permit obtaining, in a particularly simple manner, a compact and quiet timing-gear enabling high engine speeds to be achieved.

The invention will now be more particularly described with reference to the accompanying non-limitative exemplary drawings, in which:

FIGURE 1 shows schematically in longitudinal section an engine equipped with the subject timing-gear of the invention, wherein the cam-plate is journaled directly on the engine shaft, for which it serves as a bearing;

FIGURE 2 is a cross-section through the line II—II of FIGURE 1 the timing members and the respective positions of the inlet and exhaust valves of a working chamber, in relation to the direction of rotation of the engine shaft; and FIGURE 3 is a fragental longitudinal section identical to that of FIGURE 1, showing an alternative constructional form in which the engine shaft is journaled through a bearing in the engine casing, which bearing serves as external centering means of the cam-plate.

Referring first to FIGURE 1, there is shown thereon in section an engine with a rotor having four lobes 1' of epicycloidal profile and a stator with five lobes or working chambers 2'. Reference numeral 1 designates the rotor, numeral 2 the stator comprising webs 3 and 4, numeral 5 the engine shaft about the eccentric 6 of which the rotor 1 rotates, and numeral 7 the rotor driving gear which meshes with a ring-gear 8 fixedly mounted on the stator, the number of teeth on the gears 7 and 8 being in the ratio of 4 to 5.

The rotor 1 likewise bears, centered upon its axis, a pinion 9 meshing with a gearwheel 10 which is journaled on the engine shaft as at 11, the number of teeth of the gears 9 and 10 being in the ratio of 6 to 7. By reason of the eccentric rotation of the rotor at a speed of $-\frac{1}{4}$ (the speed 1 being that of the engine shaft), the specific gear-teeth ratio chosen will cause the gearwheel 10 to rotate at a speed of $-\frac{1}{14}$.

The gearwheel 10 is rigid with a cam-plate 13, the cams of which control the timing through the agency of means well known per se, an example being tappets, pushrods and rockers.

On the timing side, the engine shaft is centered in the crankcase by means of the gearwheel 10 which is provided to that end with an outer journal 12 rotating in a large-diameter bearing of the crankcase web 4.

Reference is next had to FIGURE 2, which shows the engine shaft 5 with an arrow indicating its direction of rotation, the cam-plate 13 rotating in the opposite direction to the engine and rigidly connected to the gear wheel 10 and its seven cams, the gas exhaust valve 14 and the air/fuel mixture inlet valve 15 of the working chamber 16, and the corresponding tappets 17 and 18, the respective positions of said tappets and hence of the valves, in a radial arrangement as exemplified in the drawing, being such that, assuming the direction of rotation of the engine shaft to be followed, the tappet first encountered is the exhaust valve tappet followed by the inlet valve tappet. Manifestly, this arrangement is identical for each of the five working chambers, and since the angle formed by each such pair of tappets is substantially 36°, the ten engine tappets will be very nearly regularly spaced angularly with respect to the center of the engine.

It was stated in the preamble to the present specification that the sum total of the dispositions referred to made it possible to obtain a quiet timing-gear of unusually simple and compact design enabling high engine speeds to be achieved.

For since the cam-plate rotates at one-fourteenth of the engine speed, it may be of large diameter without the riding speed of the tappet followers over the cam track being high; this in turn means that the pushrods will be very short and the inertia loads correspondingly reduced, all of which are factors favorable to high engine speeds.

Such a disposition enables any desired valve timing to be obtained. Indeed, a complete cycle of any working chamber of such a rotary engine involves two revolutions of the engine shaft, and the interval between opening of the inlet valve and opening of the exhaust valve is about 540°, as computed in the direction of rotation of said shaft and with the customary cam timings. Any given cam of the cam-plate will consequently have rotated through $-540°/14 = -36°$ between the two opening instants if it operates the inlet and exhaust valves consecutively, thereby making it necessary to angularly offset the corresponding two tappets by approximately 36° and to locate the exhaust before the inlet, with respect to the direction of rotation of the engine shaft, as disclosed and described hereinbefore.

Reference is lastly had to FIGURE 3 for an alternative constructional form which differs from that of FIGURES 1 and 2 only in that the engine shaft is directly journaled through a bearing 19 of the stator web, which bearing serves as an external centering means 20 of the gearwheel 10 rigid with the cam-plate 13, whereby said gearwheel no longer acts as centering means for the shaft 5 as was the case in the form of embodiment described precedingly.

I claim:
1. An improved timing-gear for a rotary engine comprising a stator having $2n+1$ lobes, an eccentric rotor having $2n$ lobes rotatably mounted within said stator, a plurality of inlet and exhaust valve means debouching into working chambers formed by said lobes on the inner periphery of said stator, an engine shaft having an eccen- tric portion with said rotor being mounted on said eccentric portion, first gear means mounted on said rotor engaging with second gear means fixedly mounted on said stator a cam-plate having a single cam track thereon, a plurality of tappet means operatively contacting said cam-plate and said valve means for controlling the latter, an epicyclic gear train rotating said cam-plate, said gear train comprising a pinion rigidly connected to said rotor, a ring-gear meshing with said pinion, said cam-plate being rigidly connected to said ring-gear concentric with said engine shaft and being provided with a journal bearing rotating in said stator, said cam-plate being driven in the opposite direction to said engine shaft, the tappets associated with the exhaust valves being placed ahead of the tappets associated with the inlet valves, with respect to the direction of rotation of said engine shaft, and said cam-plate having a plurality of cam surfaces thereon sufficient in number to operate said valve means.

2. A timing-gear according to claim 1 wherein said journal bearing is concentric with said engine shaft.

3. A timing-gear according to claim 1 wherein the ratio of the number of teeth on said ring-gear to the number of teeth on said pinion is so chosen that said cam-plate rotates at $1/44$ of the engine shaft speed, whereby said rotor likewise rotates at $1/44$ of the engine speed.

References Cited by the Examiner

UNITED STATES PATENTS

| 2,162,771 | 6/1939 | Winans. | |
| 3,216,404 | 11/1965 | Peras | 123—8 |

FOREIGN PATENTS

| 1,297,912 | 5/1962 | France. |
| 1,002,168 | 8/1965 | Great Britain. |

MARK NEWMAN, *Primary Examiner.*

F. T. SADLER, *Assistant Examiner.*